United States Statutory Invention Registration [19]

[11] Reg. Number: H46

Gladden [45] Published: Apr. 1, 1986

[54] PROCESS SEQUENCE FOR FABRICATING DURABLE, PERSONALIZED MAGNETIC NOTE HOLDERS

[76] Inventor: Bruce W. Gladden, 6322 Dogwood Dr., Orlando, Fla. 32807

[21] Appl. No.: 788,328

[22] Filed: Oct. 17, 1985

[51] Int. Cl.[4] ..... B32B 31/18

[52] U.S. Cl. ..... 156/267; 156/312

[56] References Cited

U.S. PATENT DOCUMENTS

| | | | |
|---|---|---|---|
| 2,293,887 | 8/1942 | Chamberlin | 41/34 |
| 3,093,919 | 6/1963 | Holtz | 40/142 |
| 4,197,151 | 4/1980 | Muzik | 156/249 |
| 4,236,331 | 12/1980 | Mattson | 40/1.5 |
| 4,310,978 | 1/1982 | Stern | 40/600 |

*Primary Examiner*—John F. Terapane
*Assistant Examiner*—Eric Jorgensen

[57] ABSTRACT

A process sequence for fabricating magnetic note holders incorporates the following steps: (a) selecting flat artwork of a particular subject; (b) trimming the artwork to the size desired for the note holder; (c) adhering the trimmed artwork to the coated side of a piece of adhesive-coated transparent material; (d) trimming the piece of adhesive-coated transparent material to the size of the trimmed artwork; (e) applying the trimmed artwork with adhered transparent layer to the adhesive-coated side of a layer of stainless steel tape; (f) trimming the stainless steel tape to the size of the trimmed artwork and adhered transparent layer; (g) adhering the transparent layer/trimmed artwork/stainless steel tape sandwich structure onto a double sided thick tape of variable thickness with the double sided tape contacting the stainless steel tape; (h) trimming the double sided tape to the size of the trimmed transparent layer/artwork/stainless steel tape sandwich structure; (i) adhering the trimmed transparent layer/artwork/stainless steel tape/double sided tape sandwich structure to a sheet of magnetized material; and (j) trimming the magnetized material to the size of the trimmed sandwich structure to form a magnetic note holder out of the combined structure.

2 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS SEQUENCE FOR FABRICATING DURABLE, PERSONALIZED MAGNETIC NOTE HOLDERS

This invention relates to a sequence of steps for fabricating magnetic note holders and, more particularly, relates to a process sequence for fabricating magnetic note holders from arbitrarily selected artwork with common household tools.

Personalized items are very popular. Thus, engraved writing implements, imprinted stationary, monogrammed items of apparel and the like are appealing because people like to see their own name or initials in written form. Similarly, individuals appreciate seeing the products of their own choosing or their own creative effort in permanent, fixed forms, especially if these products have utilitarian applications. Self-image is enhanced; a sense of accomplishment is achieved and retained, at least for the useful life of the products.

Products which have visual appeal such as ornamental, three-dimensional objects, colored printed material and the like, create the greatest impact on the human mind. Studies have shown that visual appeal has far greater impact for most individuals that the audible or tactile. Thus, to obtain the results outlined in the previous paragraph it would be desirable to utilize products of a visual type. Magnetic note holders are such a product, particularly if they can be fabricated from arbitrarily selected artwork and by common household tools. These noteholders would be useful, would allow the person to choose the artwork, and would provide a continuing sense of accomplishment.

Prior art processes for fabricating magnetic note holders have required the use of sophisticated process steps or specialized tools [See G. M. Muzik, "Graphic Laminate And Method Of Making Same", U.S. Pat. No. 4,197,151] or have been aimed at commercial rather than personal applications [See, e.g., L. Stern, "Advertising And Promotional Display Materials", U.S. Pat. No. 4,310,978 and R. W. Mattson, "Magnetic Badge Assembly", U.S. Pat. No. 4,236,331]. Or, the products while having visual appeal did not serve the utilitarian function of magnetic note holers [See, e.g., J. M. W. Chamberlain, "Decorative Sheet Material And Method Of Making The Same", U.S. Pat. No. 2,293,887 and H. J. Holtz, "Magnetic Display Arrangement", U.S. Pat. No. 3,093,919].

SUMMARY OF THE INVENTION

The process sequence for fabricating magnetic note holders includes the steps of (a) selecting flat artwork of a particular subject; (b) trimming the artwork to the size desired for the note holder; (c) adhering the trimmed artwork to the coated side of a piece of adhesive-coated transparent material; (d) trimming the piece of adhesive-coated transparent material to the size of the trimmed artwork; (e) applying the trimmed artwork with adhered transparent layer to the adhesive-coated side of a layer of stainless steel tape; (f) trimming the stainless steel tape to the size of the trimmed artwork and adhered transparent layer; (g) adhering the transparent layer/trimmed artwork/stainless steel tape sandwich structure onto a double sided thick tape of variable thickness with the double sided tape contacting the stainless steel tape; (h) trimming the double sided tape to the size of the trimmed transparent layer/artwork/-stainless steel tape sandwich structure; (i) adhering the trimmed transparent layer/artwork/stainless steel tape/double sided tape sandwich structure to a sheet of magnetized material; and (j) trimming the magnetized material to the size of the trimmed sandwich structure to form a magnetic note holder from the combined structure.

BRIEF DESCRIPTION OF THE DRAWINGS

For a more complete understanding of the process sequence for fabricating magnetic note holders of the present invention, reference may be had to the accompanying drawings which are incorporated herein by reference and in which.

DESCRIPTION OF THE PREFERRED EMBODIMENTS

For the hobbyist, businessman or creative person it is desirable to be able to fabricate magnetic note holders from arbitrary type of artwork. Thus, artwork from newspapers, comic books, magazines, packaging, badges, stamps, advertising, or from any source of printed material may be utilized with the process sequence of the present invention to produce useful magnetic note holders.

It has been found that a unique sequence of process steps will produce especially useful and attractive magnetic note holders. If the sequence is varied significantly problems occur such a lack of adhesion, warping of the note holder or sponginess in the sandwich structure. This unique sequence is set out in the ensuing paragraphs along with an identification of materials, the preferred range of dimensions and satisfactory sources of supply.

Figure 1:
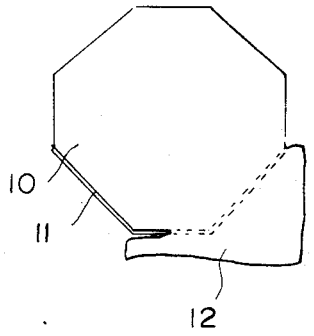
FIG. 1 is a perspective view of the selected artwork as it is being trimmed to the desired size of the note holder.
Figure 2:
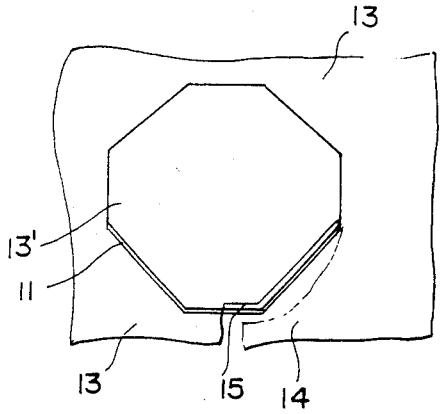
FIG. 2 is a further view of FIG. 1 after an adhesive-coated transparent sheet is adhered to the artwork of FIG. 1 and is in the process of being trimmed to the size of the artwork.
Figure 3:
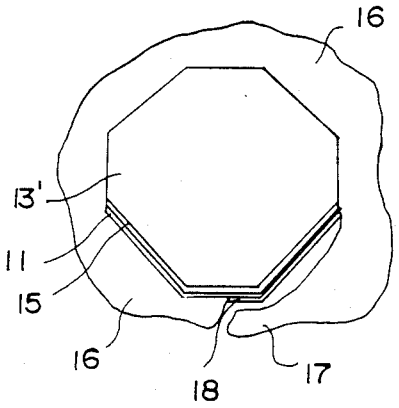
FIG. 3 is a further view of FIG. 2 after the trimmed artwork with overlying adhesive layer has been adhered to a stainless steel tape and is being trimmed to the size of the forming sandwich structure.

As seen in the perspective view of FIG. 1 an arbitrary piece of artwork 10 is being cut from a sheet of material. Typically, the sheet 12 will be printed and the artwork 10 will contain a portion of the printing which is suitable for incorporation in and retention as a magnetic note holder. Here, the artwork 10 is the shape of an octagon such as would be used in a STOP sign or in an emblem of a fraternal order. After cutting the material 12, the edge 11 of the artwork 10 is exposed. Since the perspective view is a front perspective view the forward three edges are visible, the edges of the rearward five sides are not visible, as can be seen in the succesion of FIGS. 2 through 5. The first step of the sequence is thus to trim the sheet material 12 to the size of the artwork 10. This step establishes the shape and dimension of the finished magnetic note holder, as shown for example in FIGS. 5 and 6.

The next step is to adhere a layer 13' of transparent plastic material over the surface of the artwork 10. The layer 13' is trimmed from a sheet 13 of the transparent plastic material and serves to protect the artwork 10 while allowing the printing and color of the artwork 10 to be fully visible. As the trimmed portion 14 of the sheet 13 is removed the edge 15 of the transparent layer 13' is revealed. The transparent layer 13' is preferrably washable and water resistant. Suitable sheet material may be obtained from U-Seal It Company, Inc. N.E. Cor., 20th & Callowhill Sts., Philadelphia, Pa. 19130. The material may be trimmed by common household scissors.

To provide stiffness to the magnetic note holder and to amplify magnetic properties of the magnetic note holder a stainless steel tape 16 having an adhesive-coated surface is adhered to the bottom of the artwork 10. When the tape 16 is trimmmed to the octagon shape of the artwork 10 the edge 18 is revealed, as seen where the trimmed portion 17 is pulled away from the stainless steel tape 16 in FIG. 3. When the stainless steel tape 16 is fully trimmed a sandwich structure remains which consists of the transparent plastic layer 13'/artwork 10/stainless steel layer having the edge 18. Since the three layers are flat and adhered to each other a compact sandwich structure is formed. Suitable stainless steel tape may be obtained from the Johnson Smith Co., 35075 Automation Drive, Mt. Clemens, Mich. 48043. The tape comes with adhesive on one side and may be cut by normal household scissors to the octagon shape of the artwork 10.

Figure 4:
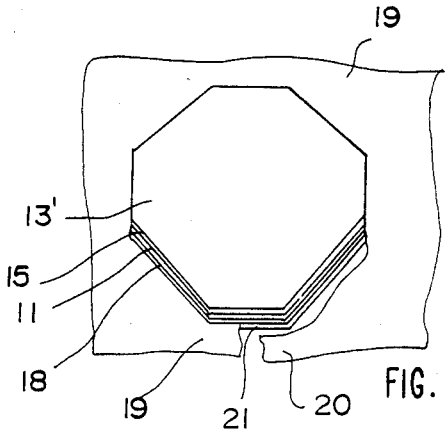
FIG. 4 is a further view of FIG. 3 after the transparent layer/artwork/stainless steel tape sandwich structure has been adhered to a double sided elastic tape and is in the process of being trimmed.

In order to provide an appreciable thickness to the magnetic note holder so that it can be easily held and not be thin enough to act as a knife a layer of foam tape, typically having adhesive on both sides, is adhered to the exposed surface of the stainless steel tape layer. Such double faced tape is widely and commonly available in thicknesses such as 1/16 inch, 1/32 inch, 1/48 inch and 1/64 inch. After the trimmed portion 20 of the foam tape 19 is removed the edge 21 is revealed (FIG. 4). When foam tape 19 is fully removed, a compact sandwich structure remains which consists of transparent layer 13'/artwork 10/stainless steel tape having edge 18/foam tape layer having edge 21. The foam tape 19 may be cut readily by a craft knife or by common household scissors. It should be noted that the edges 15, 11, 18, and 21 of the successive layers together form a blunt surface which is square with the topmost layer 13' of transparent material. The thickness of the foam tape will be chosen so as to complement the artistic effect desired or to best fit the application.

Figure 5:
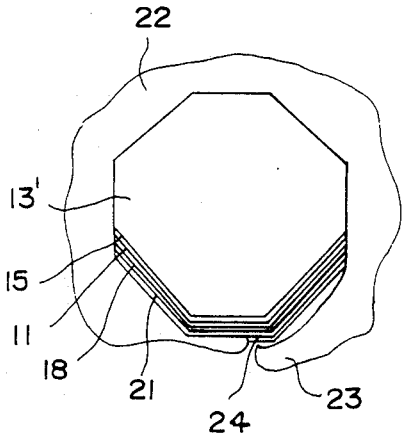
FIG. 5 is a further view of FIG. 4 after the sandwich structure has been adhered to a sheet of magnetized material and is being trimmed.

Finally, a sheet of magnetized material is adhered to the exposed surface of the foam tape. Since the foam tape preferrable has an adhesive on both sides the sheet of magnetized material will be adhered to the bottom side of the foam tape. When the trimmed portion 23 of the sheet 22 of magnetic material is removed the edge 24 is revealed. When the sheet 22 is fully trimmed a sandwich structure remains which consists of layer 13' of transparent material/artwork 10/layer of stainless steel tape having edge 18/layer of foam tape having edge 21/layer of magnetized material having having edge 24, as shown in FIG. 5. The magnetic note holder is essentially fully formed at this point. Suitable sheets of magnetized rubber material may be obtained from Permag Corporation, 6730 Jones Mill Ct., Norcross, Ga. 30092.

Figure 6:
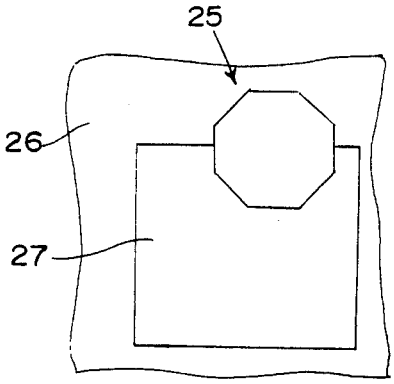
FIG. 6 is a view of the magnetized note holder holding a note on a metal surface.

Once formed by the sequence of process steps of the present invention the magnetic note holder 25 may be used in a conventional manner. Thus, as shown in FIG. 6, the note holder 25 is used to hold the note 27 up on the metallic surface 26, such as the surface of a refrigerator. As described above the magnetized layer is on the rearmost side of the note holder so as to produce good magnetic adhesion. The layer of foam tape produces body. The stainless steel payer produces stiffness and rigidity. The transparent layer 13' protects and enhances visual appeal.

I claim:

1. A process sequence for fabricating magnetic note holders, comprising the steps of:

a. trimming a piece of artwork to the size and shape desired for a magnetic note holder;

b. adhering the trimmed artwork from step (a) to the coated side of a sheet of adhesive-coated transparent material;

c. trimming said sheet of adhesive-coated transparent material to the size and shape of the trimmed artwork;

d. applying said trimmed artwork to the adhesive-coated side of a sheet of adhesive-coated stainless steel tape;

e. trimming the stainless steel sheet to the size of the transparent layer/trimmed artwork sandwich structure;

f. adhering to the stainless steel sheet of the transparent layer/trimmed artwork/stainless steel sheet sandwich structure, a sheet of adhesive-coated foam tape;

g. trimming said adhesive-coated foam tape to the shape and size of said transparent layer/trimmed artwork/stainless steel sheet sandwich structure;

h. adhering to the foam tape of the transparent layer/-trimmed artwork/stainless steel/foam tape sandwich structure, a sheet of magnetized material; and i. trimming the magnetized material to the size of the transparent layer/trimmed artwork/stainless steel/foam tape sandwich structure.

2. A process sequence in accordance with claim 1 including before step (a) the step of selecting said piece of artwork.

* * * * *